United States Patent [19]

Stange

[11] 4,073,001
[45] Feb. 7, 1978

[54] APPARATUS FOR NEUTRALIZING AND REGISTERING AN ELECTROSTATICALLY CHARGED SHEET

[75] Inventor: Klaus K. Stange, Pittsford, N.Y.

[73] Assignee: Xerox Corporation, Stamford, Conn.

[21] Appl. No.: 627,641

[22] Filed: Oct. 31, 1975

[51] Int. Cl.² ............................................. H05F 3/06
[52] U.S. Cl. .................... 361/214; 271/195; 271/208; 271/236
[58] Field of Search .................. 317/2 A, 262 A; 271/195, 105, 208, 236; 361/214

[56] References Cited

U.S. PATENT DOCUMENTS

| | | | |
|---|---|---|---|
| 1,940,536 | 12/1933 | Eyler | 271/208 UX |
| 3,422,411 | 1/1969 | Smith, Jr. | 271/195 X |
| 3,588,096 | 6/1971 | Leiter et al. | 271/195 X |
| 3,617,049 | 11/1971 | Testone | 271/105 |
| 3,918,706 | 11/1975 | Craft | 271/195 X |

Primary Examiner—R. N. Envall, Jr.
Attorney, Agent, or Firm—Carlos Nieves; James J. Ralabate

[57] ABSTRACT

In a first embodiment a stop having a plurality of ports is connected to and covers an end of a rectangular sleeve. In a region near the stop a narrow wall of the sleeve also has a plurality of ports. Near the other end of the sleeve the other narrow wall includes a plurality of ports communicating with the space inside the sleeve and a chamber of a grounded metallic manifold coupled to the sleeve. Insulators support in the chamber an electrode connected to a voltage source and a pump forces air past the electrode and into the sleeve to provide therein an ionized fluid. The fluid exits through the ports in said narrow wall and stop and if a charged sheet is in the sleeve it is neutralized and registered against said narrow wall and stop. In a second embodiment, similar to the first, the ports in the narrow wall and sleeve communicate with the chamber of a second manifold coupled to the sleeve. The second manifold is coupled to a vacuum pump for moving fluid out of the sleeve, thereby accelerating registration.

8 Claims, 3 Drawing Figures

APPARATUS FOR NEUTRALIZING AND REGISTERING AN ELECTROSTATICALLY CHARGED SHEET

The subject invention generally relates to pneumatic transports and in particular, to transports used to register articles carried thereby. Further, the invention relates to devices used to modify the electrostatic state of the articles.

The use of fluid to move articles into registration with stops is known. In fact, such use of fluids is disclosed in U.S. Pat. No. 3,588,096, issued to Leigh D. Leiter on June 28, 1971. More particularly, the patent discloses apparatus wherein fabric is delivered to a horizontally disposed support including recessed areas housing upwardly pointed nozzles. The nozzles are aligned in two different directions, and the nozzles pointing in one direction are alternately actuated with respect to the nozzles pointing in the other direction to move the fabric into registration in perpendicular directions. Further, the use of fluids for rectilinearly moving an article within a conduit or chamber is also known. In fact, this concept is disclosed in U.S. Pat. No. 3,422,411, issued to J. E. Smith, Jr., on Jan. 14, 1969. More specifically, this patent discloses a data storage cartridge which has an enclosed transfer chamber housing a data storage card. Air pressure and vacuum pressure are switched between opposite ends of the chamber to reciprocally move the card rectilinearly in the chamber. The use of AC or DC corotrons to modify the electrostatic state of charged sheets is well known to persons skilled in the art of xerography, as may be noted by inspection of U.S. Pat. No. 3,764,866, issued on Oct. 9, 1973, to Bonaventura et al.

It is noted that with the apparatus disclosed by Leigh D. Leiter as fabric is advanced, or when fabric which is smaller than the distance between nozzles is to be registered, some of the nozzles discharge into the surrounding air without having any effect on the fabric as it is moved into registration. In addition, it should be appreciated that in the system disclosed by J. E. Smith, Jr., lateral registration is provided by the distance between walls of the chamber which are parallel to the direction of travel of the storage card. Thus, the system cannot be used with cards having different width dimensions. Further, with a triboelectric series difference between the materials used to make the chamber and card, if the length of travel of a card in such a chamber is long enough and if the card rubs against a wall of the chamber during some of its travel, electrostatic charges tending to cause the card to stick may be developed.

It is an object of the present invention to provide apparatus for registering a sheet with respect to perpendicularly related axes, the sheet having any one of a range of sizes or electrostatic state.

It is another object of the present invention to provide fluidic apparatus for efficiently moving a sheet into registration with perpendicularly related axes.

Briefly, the invention disclosed herein may be used for neutralizing and registering an electrostatically charged sheet with respect to perpendicularly related axes, so long as the sheet has length and width dimensions within predetermined ranges. Structurally, the invention may be implemented with (a) a sleeve for internally accommodating said sheet, at least one point on an inner narrow wall of the sleeve being aligned in parallel with one of the axes; (b) a stop located at one end of the sleeve, the stop having at least one point aligned in parallel with the other of the axes; and (c) means for providing in the sleeve an ionized fluid stream having velocity components normal to each of the axes, whereby when a charged sheet is in the sleeve, the stream neutralizes and moves the sheet into abutment with each of said points.

Inasmuch as charged sheets are neutralized, the fluid forces required to move a sheet into registration need not overcome electrostatic forces and, hence, may be smaller than would otherwise be required for this purpose.

Additional objects and features of the invention will become apparent by reference to the following description in conjunction with the accompanying drawings, in which.

Figure 1:
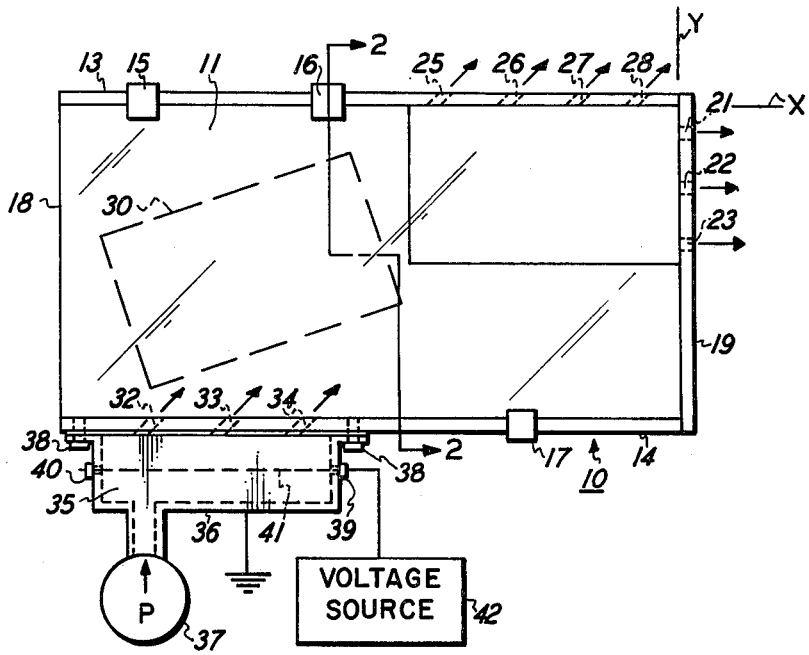
FIG. 1 is a top plan view of apparatus for neutralizing and registering a charged sheet, according to the invention, a sheet being shown therein in an unregistered position (dotted lines) and in a registered position.
Figure 2:
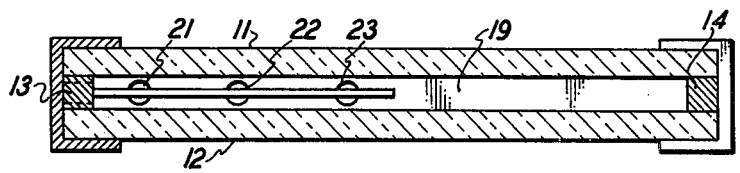
FIG. 2 is a cross-sectional view of the registration apparatus, taken along line 2—2 in FIG. 1.

Registration apparatus 10, according to the invention, is shown in FIGS. 1 and 2. Typically, the apparatus includes a pair of structurally identical rectangular plates 11 and 12, a pair of elongated rectangular members 13 and 14 disposed between the plates along longitudinally extending edges, and clamps 15–17 for holding the plates and elongated members together to form a rectangular sleeve. The plates are vertically aligned, and the elongated members are coterminous with the plates at one end 18 and at the other end provide a pair of recesses into which a stop 19 is inserted and secured. The stop 19 includes a plurality of ports 21–23 communicating with the space in the sleeve. Elongated member 13 also includes a plurality of ports 25–28 communicating with the space in the sleeve, the ports in the stop and sleeve being located adjacent a common corner. The plates, the elongated members, and the stop are assembled in a fluid tight manner, such that a fluid injected into the sleeve, as more fully described below, moves towards the common corner and exits through the ports. The stop is perpendicularly disposed with regard to the elongated members and, therefore, the common corner may be aligned with X and Y axes. The top and bottom plates are spaced from each other by approximately one-sixteenth of an inch, and a sheet of paper 30 which is smaller than the length and width of the space in the sleeve may be inserted therein as is indicated by the dotted lines. Elongated member 14 includes near the open end 18 a number of ports 32–34 communicating with the space in the sleeve and with a chamber 35 in a manifold 36. Manifold 36 is coupled to a pump 37 and to a side of the sleeve with screws 38 extending into member 14. A gasket is interposed between the manifold and sleeve to prevent leakage of fluid in the region between the manifold and sleeve. Parts 32–34 are holes whose axes generally point toward the common corner and when fluid is injected into the sleeve by pump 37, fluid exits through ports 21–23 and 25–28. In the process, the fluid moves sheet 30 into X-Y registration. It will be appreciated by those skilled in the art that a cover (not shown) may be placed over the open end after a sheet is inserted and that the presence of such a cover will increase the speed with which a sheet may be registered.

Manifold 38 supports a pair of spaced insulators 39 and 40 which in turn support an electrode 41. The electrode is connected to a voltage source 42 to produce in the chamber a corona discharge, and when the pump is on charged ions flow into the sleeve. The polarity of the ions is controlled with the polarity of the voltage provided by the source 42. Therefore, if sheet 30 is charged when it is placed in the chamber, a polarity may be chosen for neutralizing the charge. Alternatively, if the polarity of the charge on the sheet is not known, the use of an AC voltage source may be used to neutralize the sheet. Manifold 36 functions as a metallic shield for the electrode 41 and is grounded. The manifold, electrode, and pump essentially provide an ionized stream of fluid, such as air, in the sleeve and it should be noted that this may be achieved in other ways. For example, ports 32-34 may be dispensed with, and a nozzle arrangement providing ionized fluid into the open end of the sleeve can be used to move a sheet in the sleeve into registration. To move the sheet out of registration, the horizontally disposed sleeve may be tilted or a fluid stream may be injected into the sleeve through one or more of the ports in the stop 19. In this embodiment, the top and bottom plates are manufactured from glass. Thus, sheets brought into registration may be read or may be photographed with stationary or scanning equipment on one or both sides.

Figure 3:
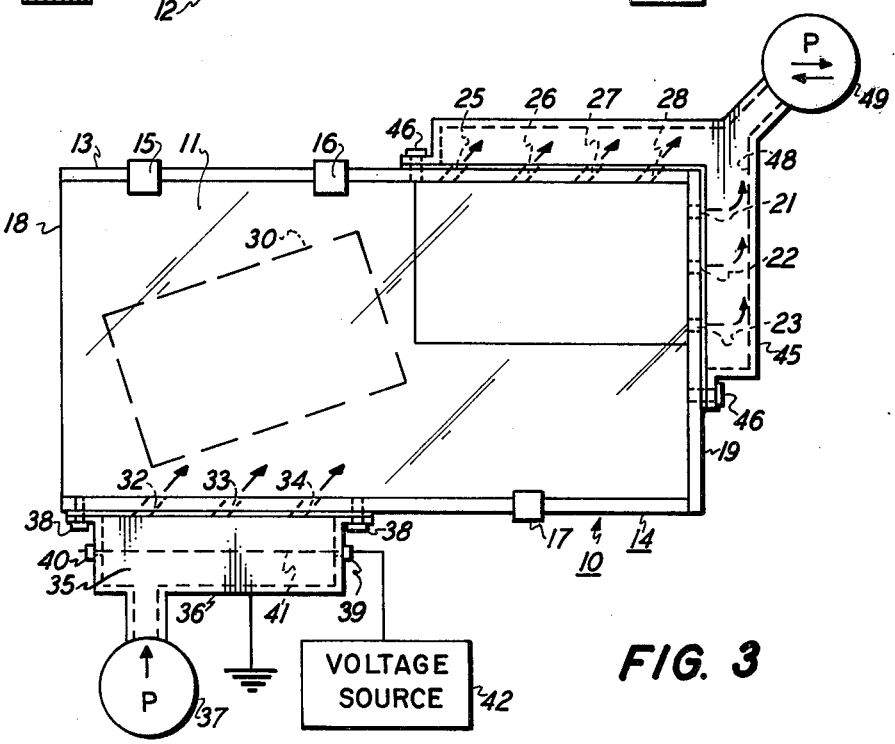
FIG. 3 is a top plan view of another embodiment of appartus for neutralizing and registering a charged sheet, according to the invention, a sheet being shown therein in an unregistered position (dotted line) and in a registered position.

The registration apparatus disclosed above may be modified or supplemented in other ways. Referring to FIGS. 1 and 3, it may be seen that the registration apparatus shown in FIG. 3 differs from that shown in FIG. 1 in that a manifold 45 is fastened with screws 46 to the elongated member 13 and stop 19. A gasket 47 is interposed between the manifold 45 and the sleeve to prevent fluid leakage. The ports 25-28 in the elongated member and ports 21-23 in the stop communicate with a chamber 48 in the manifold 45, and the chamber communicates with a vacuum pump 49. With this arrangement, the flow of fluid through the sleeve may be accelerated to more rapidly register sheets inserted through the open end of the sleeve. If pump 49 is reversible, pump 37 may be turned off, and pump 49 may be used to discharge the sheet 30 though the open end of the sleeve. Although not shown, it will be appreciated that an electrode may be mounted in manifold 45 and that a voltage source may be used therewith to provide ionized fluid for discharging the sheet.

It is to be understood that the description herein of preferred embodiments, according to the invention, have been set forth as examples thereof and are not to be construed or interpreted as limitations on the claims which follow and define the invention.

What is claimed is:

1. Apparatus for neutralizing and registering an electrostatically charged rectangular sheet with respect to perpendicularly related theoretical axes, the sheet having a length within predetermined ranges, comprising:
   a. a sleeve for internally accommodating said sheet, at least one point on an inner narrow wall of the sleeve being coincident with one of the axes:
   b. a stop located at one end of the sleeve, the stop having at least one point coincident with the other of the axes; and
   c. means for providing in the sleeve an ionized fluid stream having velocity components normal to each of the axes, whereby when a charged sheet is in the sleeve, the stream neutralizes and moves the sheet into abutment with each of said points said means including an ion source, means for directing a fluid past the ion source and into the sleeve, at least one port in the stop, and at least one port in the narrow wall, said ports providing an exit for fluid in the sleeve.

2. Apparatus as defined in claim 1 wherein said means for providing an ionized fluid stream includes a manifold coupled to the sleeve, the manifold having a chamber communicating with at least one of the ports, and a pump for discharging fluid from the manifold.

3. Apparatus as defined in claim 1 wherein said ion source includes an electrode and a voltage source coupled to the electrode and said means for directing a fluid past the ion source includes a manifold and a pump coupled to the manifold, the electrode being housed in a chamber of the manifold.

4. Apparatus as defined in claim 3 wherein said manifold is coupled to the sleeve and at least one port located on the other of the narrow walls communicates with the space in the sleeve and the chamber.

5. Apparatus as defined in claim 4 wherein said means for providing an ionized fluid stream includes another manifold coupled to the sleeve, said another manifold having a chamber communicating with at least one of the ports disposed on the narrow wall and stop, and a pump for discharging fluid from said another manifold.

6. Apparatus as defined in claim 5 wherein the pump for discharging fluid is reversible, whereby fluid may be injected into the sleeve to move a sheet out of the sleeve.

7. Apparatus as defined in claim 1 wherein said sleeve includes an upper plate and a lower plate, at least one of the plates being translucent.

8. Apparatus as defined in claim 3 wherein said voltage source provides an AC voltage to the electrode.

* * * * *